Feb. 10, 1925.                                              1,525,814
O. LASCHE
CONSTRUCTION OF ELASTIC FLUID TURBINES TO PREVENT
BREAKAGE OF BLADES DUE TO VIBRATIONS
Filed Oct. 31, 1923
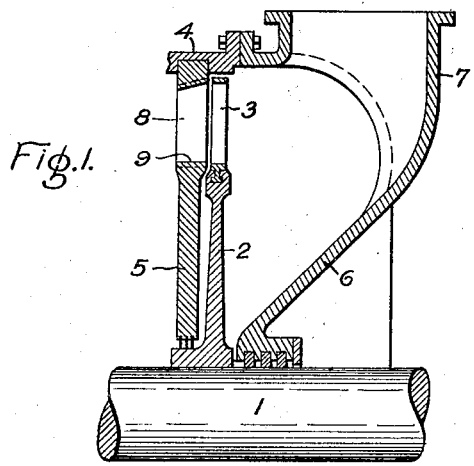
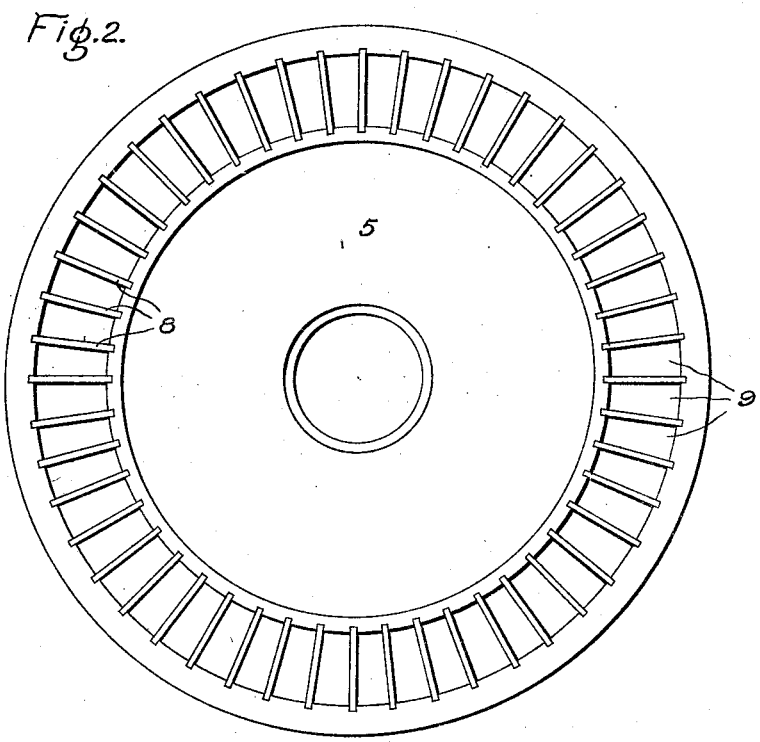
Inventor:
Oskar Lasche, Deceased.
Fritz Lasche, Administrator.
by
His Attorney.

Patented Feb. 10, 1925.

1,525,814

UNITED STATES PATENT OFFICE.

OSKAR LASCHE, DECEASED, LATE OF CHARLOTTENBURG, GERMANY; BY FRITZ LASCHE, ADMINISTRATOR, OF DRESDEN, GERMANY, ASSIGNOR TO ALLGEMEINE ELEKTRICITATS GESELLSCHAFT, OF BERLIN, GERMANY.

CONSTRUCTION OF ELASTIC-FLUID TURBINES TO PREVENT BREAKAGE OF BLADES DUE TO VIBRATIONS.

Application filed October 31, 1923. Serial No. 672,030.

*To all whom it may concern:*

Be it known that OSKAR LASCHE, deceased, a citizen of Germany, and a resident of Charlottenburg, Germany, during his lifetime invented certain new and useful Improvements in Construction of Elastic-Fluid Turbines to Prevent Breakage of Blades Due to Vibrations; and that I, FRITZ LASCHE, administrator, according to the German law, of the estate of the said OSKAR LASCHE, do hereby declare, to the best of my knowledge and belief, that the following specification, taken in connection with the accompanying drawings, is a clear, true, and complete description of said improvements.

Thorough experiments have shown that the formerly frequently inexplainable breaking of turbine buckets is to be ascribed in certain cases to the development of resonance between the natural frequency of vibration of the turbine blades of a wheel and the successive shocks received by the blades in rotating in front of the nozzles due to the elastic fluid streams issuing from the nozzles. Considering the case of an individual bucket, it will be clear that as the bucket moves from nozzle to nozzle past the nozzle partitions, it receives successive impulses of elastic fluid and the aforesaid OSKAR LASCHE discovered that when the natural frequency of vibration of the buckets per second is equal to or is a whole multiple of the product of the number of nozzles multiplied by the number of revolutions per second of the rotor, that this resonance develops and that vibrations of a dangerous character are liable to occur. Furthermore, he found that when the natural frequency of vibration of the buckets, although not exactly equal to or an exact multiple of such product, is nevertheless quite close to such relation, then under certain circumstances vibration may be set up, and in order to avoid all possibility of vibrations being set up by these causes, he found a difference of plus or minus 25 per cent desirable, although 15 per cent is probably a safe limit. That is to say, the natural frequency of vibration of the buckets divided by the product of the number of nozzles and the speed of rotation should differ by at least 15 per cent from the next whole number.

In order to avoid the critical condition above set forth, the frequency of vibration of the buckets may be influenced by changing the thickness of the buckets. This can be done, however, only within restricted limits, since by the thickening of the buckets a greater division of the same becomes necessary which unfavorably influences the efficiency. If, on the other hand, in order to obtain the same result, the width of the buckets were to be chosen greater, then the shaft would need to be made longer, thereby increasing the length of the machine and hence its cost. To change the operating speed of the turbine, if a change is at all permissible, is not possible within the limits here involved, since such a change would affect too great an extent the capacity of the driven machine.

In accordance with the said OSKAR LASCHE's invention, the resonance phenomena is avoided in that the number of nozzles is so chosen, that multiplied by the number of revolutions per second, the product is not evenly divisible into the number which represents the natural frequency of vibration per second of the buckets, and in addition falls short of being divisible by at least 15 per cent and preferably by as much as 25 per cent. Or otherwise expressed, the number of nozzles is so chosen that the natural frequency of vibration per second of the buckets is not an even multiple of the product of the number of nozzles and the speed of the buckets in revolutions per second, and differs from the next whole number by at least 15 per cent and preferably by 25 per cent.

As the resonance phenomena appears mainly with very long blades, that is in that part of the turbine where a full impact upon the blades is involved, the practical carrying out of the above rule will develop mostly into an increase of the number of nozzles above the normal measure, or a reduction of the number of nozzles below the normal measure, as an increase in the length of the nozzles is not permissible in view of good elastic fluid feed. By thus choosing the number of nozzles, the above-mentioned disadvantages will be overcome. It is possible too, in existing machines, the buckets of which in consequence of this resonance phenomena have a tendency to break, to overcome the defect by changing the number of nozzles after the manner described.

In the drawing, Fig. 1 is a radial sectional view of a turbine structure embodying my invention, and Fig. 2 is a face view of the diaphragm shown in Fig. 1.

Referring to the drawing, which shows diagrammatically and by way of example, the low pressure end of an impulse turbine, 1 indicates a shaft on which is fixed a bucket wheel 2 provided with buckets 3, and 4 indicates a turbine casing which is divided into stages by nozzle diaphragms 5. The last stage wheel of the turbine is shown and it exhausts directly to the exhaust housing 6 from whence the exhaust elastic fluid escapes through conduit 7. The nozzle diaphragm is provided with partitions 8 which define the nozzles or nozzle passages 9. Assuming that $f$ equals the natural frequency of vibration per second of the buckets, $N$ the number of nozzles, and $S$ the normal operating speed of the turbine in revolutions per second, then $N$ is so chosen that $\frac{f}{SN}$ does not equal a whole number and differs from the next whole number by at least 15 per cent, and preferably by 25 per cent.

In carrying out this invention, the natural frequency of vibration of the buckets may be determined in any suitable manner.

What is claimed as new and desired to be secured by Letters Patent of the United States, is:—

1. The method for the prevention of the arising of a resonance between the shocks exercised per second on the wheel buckets of turbines by the driving medium and the natural frequency of vibration of the buckets, characterized in that the number of nozzles is so chosen that the frequency of vibration per second of the buckets divided by the product of the number of nozzles and the speed in revolutions per second does not give a whole number.

2. The method for the prevention of the arising of a resonance between the shocks exercised per second on the wheel buckets of turbines by the driving medium and the natural frequency of vibration of the buckets, characterized in that the number of nozzles is so chosen that the frequency of vibration per second of the buckets divided by the product of the number of nozzles and the speed of revolutions per second does not give a whole number, and differs by at least 15 per cent from the next whole number.

3. An elastic-fluid turbine having diaphragms provided with nozzles which direct elastic fluid to the turbine buckets, characterized by the fact that in each instance the number of nozzles is so chosen in advance that the natural frequency of vibration per second of the buckets is not an exact multiple of the product of the number of nozzles and the number of revolutions per second of the buckets.

4. An elastic-fluid turbine having diaphragms provided with nozzles which direct elastic fluid to the turbine buckets, characterized by the fact that in each instance the number of nozzles is so chosen in advance that the natural frequency of vibration per second of the buckets is not an exact multiple of the product of the number of nozzles and the number of revolutions per second of the buckets, and that the quotient obtained differs by at least 15 per cent from the next whole number.

In witness whereof, I have hereunto set my hand this 22nd day of September, 1923.

FRITZ LASCHE,
*Administrator of Oskar Lasche, deceased.*